Patented Apr. 18, 1939

2,155,067

UNITED STATES PATENT OFFICE 2,155,067

MANUFACTURE OF IMPROVED PRODUCTS OF CELLULOSE AND CELLULOSE DERIVATIVES

Leo Ubbelohde, Berlin-Charlottenburg, Germany

No Drawing. Application May 18, 1935, Serial No. 22,178. In Austria June 1, 1934

18 Claims. (Cl. 18—54)

My invention refers to the manufacture of improved products of cellulose and/or cellulose derivatives more particularly to products of the nature of threads, fibres, horsehair, ribbons, films and the like made of these cellulosic materials.

One object of the present invention is to manufacture products of the nature mentioned in such a manner that they will tend to substantially retain any shape imparted to them.

In accordance with the present invention substances which are capable of being solidified to a suitable flexible rigidity, for example, by chemical reaction, such as condensation, polymerization, (double) decomposition or other chemical transformation, or by the effect of physical action, are added to the solutions of cellulose before such solutions are subjected to treatment to yield products of the shape desired. These substances which are capable of being solidified are dissolved in the solutions of cellulose before the same are treated, and during or after the shaping treatment said substances are transformed to the solid state. The term "solid or solidification" as used herein is intended to include such plastic materials as may have sufficient rigidity to accomplish the desired result.

Examples of the nature noted are suitable mixtures of a phenol and an aldehyde, more specially of phenol-formaldehyde, urea and/or urea-derivatives with an aldehyde, other resins made of aldehydes or with the participation of aldehydes, polyvinyl products in the soluble state, glyptal, cumaron resinous products obtainable from phenols and aldehydes, especially formaldehyde, known as "Resinite", resinous products obtained from urea or its derivatives and aldehydes, especially formaldehyde, known as "Pollopas", and the like. All these substances may be used even in a partially condensed but still soluble state with more or less success. In the book of Johann Scheiber and Kurt Saendig, "Die künstlichen Harze" (Stuttgart 1928) on page 290 ff. and others many of these substances and the way in which they may be solidified are described. For most purposes the solidified substances should be colourless and the process of solidification should be possible under conditions which do not damage the products of cellulose (fibres, artificial silk-threads, horsehair, ribbons, films and the like).

An example of one particularly effective application of my invention is found in the production of crinkled or undulated fibres, crinkled silk, crinkled ribbons and the like. Many processes for the manufacture of curled artificial fibres or threads have been proposed, especially since artificial staple fibre has overstocked the market, as these fibres, either alone or in mixture with other fibres, can be worked better when they have a more or less permanent curl imparted to them. Not only artificial fibres but also artificial silk may be crinkled and treated in the manner described. Such crinkly silk will make it possible to get special effects heretofore unknown in fabrics containing such silk threads. It has however until the present invention not been possible to give the silk or fibre a crinkling or undulating that may be kept even in the weft made out of it, as all the crinkling or undulating methods heretofore proposed did not procure a crinkle resistant to wet-treatment.

Is is even possible to bring artificial or natural fibres or threads or horsehair or ribbons, films and the like into a crinkly condition or to impart to them a relieflike effect or other shape in a manner similar to that described in drowning the products, already aftertreated and dried, if necessary, in a solution of suitable concentration of the substances heretofore mentioned, for instance, in a suitable (preferably aqueous) solution of the substances mentioned, containing, for example, about 6% of these substances. After the product has been loaded properly with the solution it is squirted or extruded and then shaped in the manner herebefore described, solidifying the incorporated substances in the meantime while shaping the product or after having shaped it.

In performing the process, all substances to be incorporated in the products to be crinkled will be of such nature as not to attack the cellulose or the cellulose derivatives chemically or physically and such as may by physical or chemical process be transformed to an insoluble (solid) condition.

Staple fibres, which very often are cut to small pieces immediately after the spinning may be satisfactory to produce a crinkly condition which afterwards may be fixed by hardening (solidifying) the incorporated substances heretofore mentioned, in any possible manner. As a rule though a wool-like crinkly condition of the fibre will result in using a proper tool as e. g. pairs of fluted or of finely dentated (corrugated) rollers which may be heated in case the condensation of the incorporated substances is to be performed in the meantime, though it may as well be performed after the crinkling process has been finished.

An illustrative procedure which may be followed for the production of such curled fibres is as follows:

Examples

1. A quantity of ½–10% (calculated on cellulose) of a prepared mixture of 100 parts of urea with 200 parts of a watery solution of formaldehyde (usually in the trade containing 30–40% of $H_2CO$) is added to a spinning solution for example to a viscose or to a solution of cuprammonium-cellulose. Instead of this mixture an equivalent quantity of dimethylolurea (already condensated but still soluble in the spinning solution) may be taken. Other soluble substances heretofore mentioned which can be hardened or rendered insoluble by a physical or chemical process which does not damage the cellulose or cellulose derivatives may be used either alone or in a mixture with each other. The spinning solution then is formed into the desired product (artificial silk, fibre, ribbon, horsehair, film and the like) in a well known manner by any suitable process of coagulation or decomposition; it then may be aftertreated if necessary and be sent through a crinkling tool, any machinery that will impart to the product a wool-like appearance being usable, for example, pairs of very finely corrugated rollers or any other apparatus suitable for this purpose. On films, other effects besides curling, for example, any relieflike effect may be brought about by imprinting or the like. The hardening of the substances incorporated in the ready formed products through addition to the spinning solution, may be performed during the crinkling or imprinting process, for example, by using a heated crinkling or like tool, or it may be performed after the crinkling or imprinting of the effects has been finished.

For example in using dimethylolurea as an addition a short heating up to 130° C. will be sufficient, though by adding other substances to the spinning solution a longer time and even a higher temperature may be necessary for performing the hardening process.

2. If the cellulosic product (consisting of cellulose or a cellulose derivative) is already formed and it is desired to impart to it a crinkly or some other effect, as mentioned before, it is steeped in a solution of the substances mentioned, that is to say, such substances which can be hardened and rendered insoluble in the manner described. Any surplus of the solution adhering on the outside of the product is removed for example, by wiping it off, or by centrifugating. The cellulose product then is subjected to a process for giving it a crinkly or any other special effect. The hardening of the substances incorporated in the cellulose product will take place, in the heretofore described manner, either while imparting the special effect or after this effect has been given to the product. The concentration of the solution of the substances to be hardened after their incorporation in the cellulose product to which the special form is to be imparted in a manner as to withstand any washing or other wet or dry-process, may vary according to the effect to be obtained but as a rule solutions of about 5–20% will be sufficient.

3. During the process of dissolving a xanthogenate for making a viscose containing 7.5% of cellulose and 6.5% of alkali, a partially condensated mixture of urea and formaldehyde or a similar synthetic resin-like substance soluble in alkali and to be hardened in an acid medium, which is known in the trade, is dissolved in a small part of the lye used for dissolving the xanthogenate, the quantity of the dissolved mixture being about 3–5% of the cellulose in the viscose. The viscose then is spun into artificial fibres in an acid spinning bath containing about 160 g. of $H_2SO_4$-monohydrate and 240 g. of $Na_2SO_4$ in 1 liter, it may then be crinkled or not. No further condensation or polymerization of the mixture of urea and formaldehyde is necessary when using this mixture known in the trade which is hardened by bringing it in an acid medium (according to Joh. Scheiber and Kurt Saendig, "Die künstlichen Harze", Stuttgart 1928, page 312; see too Carlton Ellis, "Synthetic resins and their plastics").

Having now described my invention and the manner in which the same is to be performed that what I claim is:

1. A process for the manufacture of improved products from solutions containing cellulosic material which comprises adding to them solutions of condensable substances which are to be rendered insoluble by further condensation, spinning the composite solution to form a filament and then heating the filament to bring about further condensation and solidification of the incorporated substances, crinkling the filament and subjecting the incorporated substances to further condensation to bring about solidification.

2. A process for the manufacture of improved products from aqueous solutions of cellulosic material which comprises adding to them solutions of condensable substances which are to be rendered insoluble by further condensation, spinning the composite solution to form a filament and then heating the filament to bring about further condensation and solidification of the incorporated substances while crinkling the filament.

3. A process for the manufacture of improved products from aqueous solutions of cellulosic material which comprises adding to them solutions of condensable substances which are to be rendered insoluble (solid) by further condensation, spinning the composite solution to form a filament, crinkling the filament and then subjecting the incorporated substances to further condensation to bring about solidification.

4. A process for the manufacture of improved products from a viscose solution which comprises adding to it 1–6% (calculated on the content of cellulose in the viscose) of a mixture of 100 parts of urea with 2000 parts of a watery solution of formaldehyde (containing 30–40% of $H_2CO$), spinning artificial fibres in a known manner from the composite solution, imparting to the fibres an undulated formation and condensing the urea and the formaldehyde to the insoluble (solid) state by heat while the fibre is in said undulated form.

5. A process for the manufacture of improved products from a viscose solution which comprises adding to it during the solution of the xanthogenate 4% (calculated on cellulose) of a partially condensated mixture of urea and formaldehyde dissolved in a part of the lye for dissolving the xanthogenate, the added mixture being soluble in alkali and hardening slowly in an acid-medium, spinning artificial fibre from the composite solution into an acid-bath and crinkling the fibres.

6. A process for the manufacture of improved products from a viscose solution which comprises adding to it 1–6% (calculated on the content of cellulose in the viscose) of a mixture of 100 parts soluble dimehylolurea with 0,5 parts of acid phosphate of sodium, spinning artificial fibre from the composite solution in a known manner, making the fibre crinkly and rendering the dimethylolurea insoluble (solid) by heat.

7. A process for the manufacture of improved products from a viscose solution which comprises adding to it 1-6% (calculated on the content of cellulose in the viscose) of a mixture of 100 parts soluble dimethylolurea with 0,5 parts of acid phosphate of sodium, spinning artificial fibre from the composite solution in a known manner, aftertreating the fibre, then making the fibre crinkly and rendering the dimethylolurea insoluble (solid) by heat.

8. A process for the manufacture of crinkled artificial filaments for use in the textile industry which comprises forming a filament including cellulosic material and a thermo-setting substance which is soluble therein and is capable of being converted to form a solid resinous material, crinkling the product thus formed and heating to to transform the convertible substance to a solid resinous material.

9. A process for the manufacture of crinkled artificial filaments of cellulosic material for use in the textile industry which comprises forming a solution containing cellulosic material and a thermo-setting substance which is capable of being converted to form a solid resinous material, forming a filament from said solution, crinkling the filament formed from the solution and heating it to transform the convertible substance to a solid resinous material.

10. A process for the manufacture of crinkled artificial filaments for use in the textile industry which comprises forming a filament including cellulosic material and a thermo-setting substance which is soluble therein and is capable of being condensed to form a solid resinous material, crinkling the filament so formed and heating it to condense the condensable substance to a solid resinous material.

11. A process for the manufacture of crinkled artificial filaments for use in the textile industry which comprises forming a filament including cellulosic material and a thermo-setting substance which is soluble therein and is capable of being polymerized to form a solid resinous material, crinkling the filament so formed and treating it to polymerize the polymerizable substance to a solid resinous material.

12. A process for the manufacture of crinkled artificial filaments of cellulosic material for use in the textile industry which comprises passing a filament formed of such material through a solution of a thermo-setting substance which is soluble in the cellulosic filament and is capable of being transformed to form a solid resinous material, to thereby cause said cellulosic filament to absorb a portion of said solution, and crinkling the filament and simultaneously transforming the thermo-setting substance absorbed thereby to a solid resinous material.

13. A process for the manufacture of crinkled artificial filaments of cellulosic material for use in the textile industry which comprises passing a filament formed of such material through an aqueous solution of a thermo-setting substance which is soluble in the cellulosic filament and is capable of being transformed to form a solid resinous material, to thereby cause said cellulosic filament to absorb a portion of said solution, and crinkling the cellulosic filament and simultaneously transforming the thermo-setting substance absorbed thereby to a resinous material.

14. A process for the manufacture of crinkled artificial filaments of cellulosic material for use in the textile industry which comprises passing a filament formed of such material through an aqueous solution of a thermo-setting substance which is soluble in the cellulosic filament and is capable of being transformed to form a solid resinous material, to thereby cause said cellulosic filament to absorb a portion of said solution, crinkling the cellulosic filament and thereafter transforming the substance absorbed thereby to a solid resinous material.

15. A process for the manufacture of crinkled artificial filaments of cellulosic material which comprises passing a filament formed from such material through a solution of a thermo-setting substance which is soluble in the cellulosic filament and is capable of being condensed to form a solid resinous material, to thereby cause said cellulosic filament to absorb a portion of said solution, and crinking the cellulosic filament and simultaneously condensing the thermo-settting substance absorbed thereby to a solid resinous material.

16. A process for the manufacture of crinkled artificial filaments of cellulosic material which comprises passing a filament formed from such material through a solution of a thermo-setting substance which is soluble in the cellulosic filament and is capable of being polymerized to form a solid resinous material, to thereby cause said cellulosic filament to absorb a portion of said solution, and crinkling the cellulosic filament and simultaneously polymerizing the thermo-setting substance absorbed thereby to a solid resinous material.

17. A crinkled artificial filament of cellulosic material for use in the textile industry made in accordance with the method set forth in claim 8.

18. A crinkled artificial filament of cellulosic material for use in the textile industry made in accordance with the method set forth in claim 10.

LEO UBBELOHDE.